Patented Apr. 19, 1938

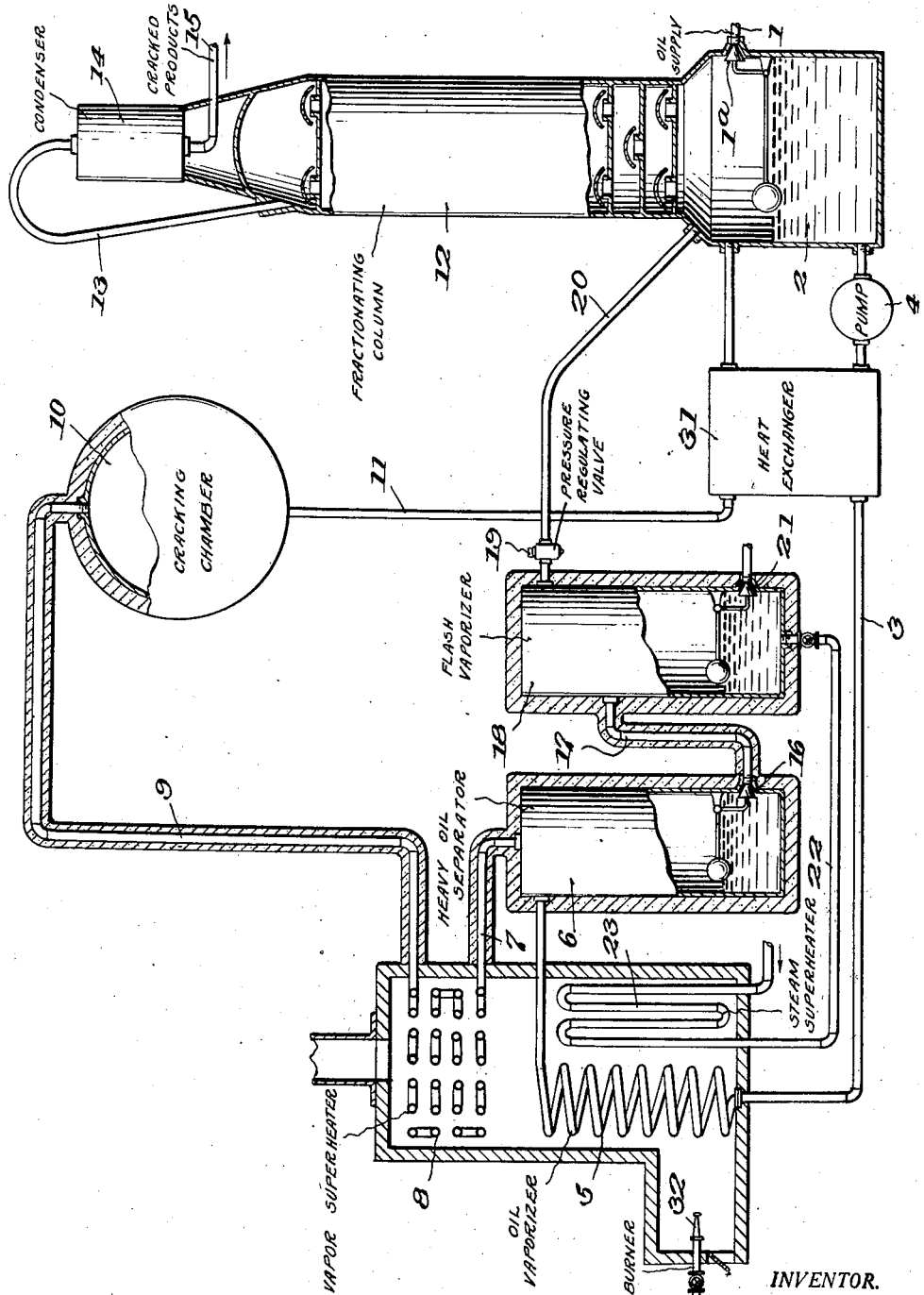

2,114,312

UNITED STATES PATENT OFFICE 2,114,312

APPARATUS FOR MANUFACTURE OF USEFUL PRODUCTS FROM OIL

Ralph Monroe Parsons, Amagansett, N. Y., assignor, by mesne assignments, to Houdry Process Corporation, Wilmington, Del., a corporation of Delaware Application February 28, 1928, Serial No. 257,730

1 Claim. (Cl. 196—104)

This invention relates to improvements in apparatus for manufacture of useful products from oil; and it relates more particularly to the treatment of relatively heavy mineral oils of the petroleum type for the manufacture of lower-boiling products therefrom, such as motor fuel and the like.

In recent practice there has been developed a process wherein mineral oil to be converted or cracked is first heated to a temperature below that normally effective for cracking, but sufficiently high to obtain a mixture of oil vapors and unvaporized relatively heavy liquid oil, this mixture being conducted to a separator which removes the unvaporized oil from the vapor, the separated vapors being conducted through suitable heating or superheating elements where they are brought to a temperature that is amply high to effect cracking, but so rapidly as to avoid extensive cracking at this stage or deposition of carbon, the vapors then traveling through a cracking or converting chamber where effective vapor-phase cracking takes place, the resultant cracked vapors being then appropriately treated to recover therefrom a lower-boiling condensate, such as a motor fuel condensate. The liquid removed by the separator is drained off through a suitably arranged valved discharge outlet.

In carrying out the above procedure under conditions where only a small proportion of the mixture of liquid oil and oil vapors is removed as liquid oil by the separator, that is, with a high separator inlet temperature, difficulty is sometimes experienced in effecting substantially complete removal of the liquid oil with the result that in some cases liquid oil passes on with the vapors to the superheating elements where it carbonizes and eventually causes shut-down of the plant due to accumulation of carbon in such elements. The high separator inlet temperature also results in carbonization of the vaporizing elements and the separator.

On the other hand, if the separator inlet temperature is maintained at a relatively low value, a large proportion of the mixture of liquid oil and oil vapors will be withdrawn from the separator as liquid oil. This oil will be composed not only of the heavy residuum oil which it is desired to remove or separate in the liquid state, but also of lighter oil which is suitable for conversion into the desired low-boiling product, and which it is therefore desired to separate from the heavy residuum oil.

It is a principal object of the present invention to improve the process generally set forth above in such a way as to eliminate the stated difficulties in connection with the separation of the liquid oil-vapor mixture and to provide a procedure whereby such separation can take place at comparatively low separator inlet temperature and yet enable eventual vaporization, in an efficient and economical manner, of the lighter oil suitable for conversion into the desired low-boiling product.

Another object of the invention is to provide a procedure whereby such separation can be carried on continuously and simultaneously with the carrying out of the general process set out and at low initial and operating expense.

Another object of the invention is to provide apparatus of an improved type wherein the process as modified in accordance with the present invention may be carried out to advantage.

Other and more specific objects of the invention, together with further advantages obtained thereby, will appear more fully hereinafter.

In its most advantageous practical embodiment, the present invention is characterized by effecting vaporization of the lighter constituents of the liquid oil initially separated in the separator, without application of heat from an external source, the heat of vaporization being supplied by the sensible heat of the hot liquid utilized at a pressure lower than that at which the initial separation occurred, the resultant vapors being appropriately employed in furthering the main process as, for example, by being condensed and the hot condensate returned to the system. Of course, heat from an external source may be supplied, if desired, to assist in the vaporization of the separated oil.

A further explanation of the invention can best be given in connection with a concrete illustrative embodiment thereof which will now be described in connection with the accompanying drawing in which the single figure is a more or less diagrammatic or schematic representation, in side elevation, of one form of apparatus system that can be used to advantage in practicing the process of the invention.

Referring to the drawing, I represents a supply pipe controlled by liquid-level regulating valve 1a, through which heavy oil to be cracked enters the feed tank 2 where it mixes with hot recycle oil, to be referred to hereinafter. A topped crude petroleum is an example of a heavy mineral oil that can be successfully cracked or converted by the present process, but it is to be understood that other kinds of mineral oil and residua may be used as starting material. The temperature of the composite oil in tank 2 may vary from 300°–500° F. and in a typical instance averaging around 380° F. From tank 2 the composite oil passes through pipe line 3 and is pumped under pressure by pump 4 to the vaporizing coil or element 5 of the heater which may desirably be a pipe-still. The pressure at the pump discharge may vary from 50–100 pounds per square inch and in a typical instance may be in the neighborhood of 90–95 pounds per square inch. A heat exchanger diagrammatically shown at 31 is preferably provided in pipe line 3 between the pump and the heater for the purpose of causing the hot vapors in pipe 11 (referred to hereafter) to give up heat to the composite oil going to the heater. The oil is heated in the exchanger 31 so that when it reaches the heater the temperature of the oil at the inlet is between 500° to 700° F., averaging around 640°–645° F. in a typical instance. The heater for volatilizing the more volatile constituents of the oil consists of a coil 5 heated by any suitable means, such as a burner 32. The composite oil is heated in the vaporizing coil to a temperature most desirably ranging from about 650° to 800° F., the exact temperature most desirable to employ being dependent somewhat upon the particular oil employed as starting material. A temperature within this range, while insufficiently high to effect extensive cracking, is nevertheless high enough to vaporize practically all that lighter portion of the oil which it is desired to permit to enter the cracking or converting zone. The mixture of vapors and liquid particles of unvaporized oil associated therewith leaves the initial heating coil 5 and enters suitable mechanical separator means 6, in the present instance shown as an upright separator of the vertical cylindrical drum type. The pressure in the separating means is not much lower than that under which the mixture of liquid and vapors leaves coil 5, ranging from about 30 to 90 pounds per square inch, averaging around 60–65 pounds per square inch in a typical instance; and while there is some drop in temperature, this is not an "extensive reduction of temperature" within the intended meaning of this expression as herein employed. The temperature in the separator may vary between 650°–800° F., averaging around 750° F. in a typical instance.

In this separator, the unvaporized constituents of the oil, including not only tarry matter but also a substantial proportion of lighter oils suitable for conversion, drop out in liquid form and collect in the lower part of the separator from which they are drawn from time to time or continuously through the liquid-level-regulating valve 16 controlling the liquid outlet.

From the separator 6 the mineral oil vapors pass through exit pipe 7 to the superheater coil or element 8, which is subjected to more intense heat than coil 5; and the oil vapors in passing at high velocity through coil 8 are very rapidly brought to a temperature varying between 1000°–1100° F., averaging around 1050° F. in a typical instance, but do not remain therein long enough to permit substantial cracking or carbonization to occur there. From superheater coil 8 the superheated vapors pass through pipe 9 to the vapor-phase cracking or reaction unit 10, where the vapors are maintained at a sufficiently high temperature and for a sufficiently long time to enable effective cracking or conversion to take place, the resultant cracked vapors passing through pipe 11 to the heat exchanger 31 and then to the fractionating column 12. Pipes 7 and 9 and unit 10 are heavily insulated to conserve heat. It is to be understood however that the present invention, in its broader aspects, is not limited to any specific procedure for cracking or otherwise treating the effluent vapors from the separator 6.

The unvaporized constituents which drop to the bottom of the separator 6 include, as already stated, heavy residuum oil which should be removed from the system and also light oil suitable for conversion into the desired light product.

As previously stated, it is the prime object of the present invention to provide an effective and economical procedure for separating this residuum oil from the lighter oil associated therewith and for returning this lighter oil to the system for eventual conversion into the desired product. In the broader aspects of the invention, this procedure may take various specific forms, but that about to be described is especially desirable because of its effectiveness and simplicity, and because the apparatus for carrying it out can be constructed and operated at low expense.

From the separator 6, the oil at the high pressure and temperature obtaining in the separator, is drained off through the liquid-level regulating valve 16, flowing through pipe 17 to the flash vaporizer 18, where separation of the remaining portion of the lighter oil from the heavy residuum oil takes place. Pipe 17 is heavily insulated to reduce heat losses to a minimum, but may, to give a range of temperature control, be provided with a heat exchanger (not shown) to reduce the temperature of the oil entering vaporizer 18. The chamber or vaporizer 18 is well insulated to conserve heat, but it is maintained at a pressure substantially lower than that existing in the separator 6, in order that vaporization may take place without addition of heat from an external source. The heat of vaporization is supplied by the sensible heat of the hot oil which passes into the vaporizing chamber and which, at the pressure therein prevailing, is in a superheated condition.

The vapors formed in vaporizer 18 pass through the pressure regulating valve 19 and pipe 20 to the feed tank 2 where they largely condense, the hot condensate mingling with the fresh oil for rerunning. The degree of vaporization in vaporizer 18 can be controlled by controlling the pressure and/or temperature therein. The pressure may be controlled by the regulating valve 19. The greater the pressure with respect to that of the separator 6, the smaller will be the amount of oil recovered or vaporized. The temperature may be controlled by controlling the temperature of the oil admitted, by use of cooling apparatus which can be connected in series with pipe 17 or by admitting gas at controllable temperature through pipe 22, or by varying the temperature of the oil-vapor mixture admitted to the separator 6.

The oil not vaporized in vaporizer 18 is drained off through the liquid level regulating valve 21 and flows to storage or is otherwise disposed of.

Although the primary object of the invention is to obtain vaporization of the separated oil by utilizing the sensible heat of the oil, if it is desired to increase the rate of vaporization in the vaporizer 18, it can be done by admitting steam or other gas or vapor through pipe 22, and by controlling the amount and temperature of the steam or other gas or vapor admitted, and thus controlling the partial pressure of the oil vapors, the degree of vaporization in vaporizer 18 may be controlled. Before the steam or other gas or vapor is admitted through pipe 22 it is preferably superheated by passage through the heating coil 23. When the temperature of the steam or other gas or vapor admitted at 22 is in excess of that of the temperature prevailing in the vaporizer 18, it will be seen that some of the oil will be vaporized through addition of the heat thus supplied. The mixture of steam and oil vapor will then flow through pipe 20 to the feed tank 2 where the oil vapor will condense, but the steam or other gas or vapor will pass out of the system with the cracked vapors from the cracking zone, through the fractionating column 12, pipe 13, condenser 14 and pipe 15.

It will be seen that the process can be carried on continuously and economically, heat losses being reduced to a minimum and maximum recoveries of the desired product being secured.

It is to be understood that the foregoing specific examples of process and apparatus are given merely for the purpose of explaining the principles of the invention by means of concrete operative embodiments thereof that have given satisfactory results in practice; but that the invention is in no sense limited to the particular details of process and apparatus hereinabove given.

What is claimed is:

Apparatus for converting mineral oil into lower-boiling products which comprises, in combination, means for heating oil to obtain oil vapors mixed with liquid oil, liquid separating means connected to such heating means and into which such vapor-liquid mixture is discharged, cracking means receiving separated oil vapors from said separator means, a vaporizer receiving separated liquid oil from said separator means, a chamber adapted to receive the discharge from said cracking means and the vapor from said vaporizer, and means for returning the heavier constituents of the oil introduced into said chamber to said oil heating means.

RALPH MONROE PARSONS.